US012260685B2

(12) United States Patent
Safavi

(10) Patent No.: US 12,260,685 B2
(45) Date of Patent: Mar. 25, 2025

(54) METHOD AND APPARATUS FOR AUTOMOTIVE VEHICLE DIAGNOSTICS USING COGNITIVE SMART SENSORS

(71) Applicant: Chaoyang Semiconductor Jiangyin Technology Co. Ltd., San Diego, CA (US)

(72) Inventor: Saeid Safavi, San Diego, CA (US)

(73) Assignee: CHAOYANG SEMICONDUCTOR JIANGYIN TECHNOLOGY CO., LTD., San Diego, CA (US)

( * ) Notice: Subject to any disclaimer, the term of this patent is extended or adjusted under 35 U.S.C. 154(b) by 384 days.

(21) Appl. No.: 17/635,535

(22) PCT Filed: Aug. 10, 2020

(86) PCT No.: PCT/US2020/045622
§ 371 (c)(1),
(2) Date: Feb. 15, 2022

(87) PCT Pub. No.: WO2021/034530
PCT Pub. Date: Feb. 25, 2021

(65) Prior Publication Data
US 2022/0335755 A1    Oct. 20, 2022

Related U.S. Application Data

(60) Provisional application No. 62/888,256, filed on Aug. 16, 2019.

(51) Int. Cl.
*G07C 5/08* (2006.01)
*B60W 50/02* (2012.01)
*G07C 5/00* (2006.01)

(52) U.S. Cl.
CPC ....... *G07C 5/0808* (2013.01); *B60W 50/0205* (2013.01); *G07C 5/008* (2013.01); *B60W 2050/0215* (2013.01)

(58) Field of Classification Search
None
See application file for complete search history.

(56) References Cited

U.S. PATENT DOCUMENTS 8,134,462 B1 *   3/2012   Tran .................... G08B 21/084
                                                340/426.25
9,582,762 B1 *   2/2017   Cosic .................... H04N 7/157
(Continued)

*Primary Examiner* — Raul J Rios Russo
*Assistant Examiner* — Carl F. R. Tchatchouang
(74) *Attorney, Agent, or Firm* — Jaquez Land Greenhaus & McFarland; Bruce W. Greenhaus

(57) ABSTRACT

Various embodiments of a method and apparatus for diagnosing the status of a vehicle using cognitive SMART sensors are disclosed. The SMART sensors have at least some processing power directly associated with the sensor. The SMART sensor that include an artificial intelligence (AI) core are is tightly coupled to the sensor within the SMART sensor. The sensor may be an audio sensor, such as a high quality microphone, that can record sounds that emanate from of the vehicle. Such sounds may be associated with one or more of the components of the vehicle. The AI core analyzes the sounds that emanate from the vehicle to determine the operational status of the vehicle. A communication module allows the result to be communicated to remotely located interested entities.

12 Claims, 12 Drawing Sheets

(56) References Cited

U.S. PATENT DOCUMENTS

| | | | | |
|---|---|---|---|---|
| 2017/0076514 | A1* | 3/2017 | Valeri | G05B 23/00 |
| 2019/0138268 | A1* | 5/2019 | Andersen | G06F 16/90332 |
| 2019/0272755 | A1* | 9/2019 | Giorgi | H04W 4/40 |
| 2019/0392254 | A1* | 12/2019 | Oh | G06N 7/01 |
| 2023/0152921 | A1* | 5/2023 | Nakamura | H03K 17/96 |
| | | | | 324/600 |

* cited by examiner

METHOD AND APPARATUS FOR AUTOMOTIVE VEHICLE DIAGNOSTICS USING COGNITIVE SMART SENSORS

CROSS-REFERENCE TO RELATED APPLICATIONS—CLAIM OF PRIORITY

The present application claims priority to U.S. Provisional Application No. 62/888,256, filed Aug. 16, 2019, entitled "Method and Apparatus for Automotive Vehicle Diagnostics using Cognitive Smart Sensors", which is herein incorporated by reference in its entirety.

BACKGROUND

(1) Technical Field

The disclosed method and apparatus relate generally to systems for assisting in determining the operational status of a motor vehicle. In particular, the disclosed method and apparatus relates to a system of transmitters and receivers, associated with sensors tightly coupled with processors that can analyze information sensed and communicate results of the analysis to assist in determining the status of a motor vehicle.

(2) Background

It is commonplace today for automobiles and other vehicles, such as trucks, buses, etc. to have several sensors installed through the vehicle for sensing the status of particular aspects of the vehicle. For example, anyone that drives is likely to be familiar with the gas gauge and temperature gauge, as well as the oil pressure gauge, voltage gauge, etc. that are commonly found on the dashboard of a car, truck, etc. It is also likely that most drivers are aware that these gauges are connected to sensors within the vehicle. In addition, in most vehicles manufactured today, there are several other sensors within the vehicle that are connected to an On-Board-Diagnostics (OBD) system. Some of these sensors may be the same sensors that are connected to gauges and warning lights on the dashboard of the vehicle. Others may be connected only to the OBD system.

FIG. 1 is an illustration of a vehicle 101 and some of the sensors 103 associated with the OBD system of the vehicle 101. There are several sensors 103 shown as examples of some of the types of sensors that might be present in a vehicle 101, such as the motor position sensor 103a, the chassis level sensor 103b, the headlight range sensor 103c, etc. It should be noted that features in the figures that are referenced with both numbers and letters, may be collectively referenced by the numbers without the letter. For example, sensors 103a. 103b, 103c may be collectively referenced as sensors 103.

An OBD system having several such sensors can provide warnings based on the output of the sensors. Such warnings can be communicated through a user interface located on the dashboard of the vehicle. Alternatively, such warnings can be communicated to an OBD electrical connector to which a diagnostic analyzer can be connected. Typically, the OBD electrical connector is located under the dashboard of the vehicle, making it accessible to a mechanic. Currently, OBD systems output codes, known as Data Trouble Codes (DTCs). These codes indicate potential service issues with the vehicle. Mechanics typically use these codes to assist in diagnosing trouble with the engine or other systems of the vehicle, such as the brakes, lights, coolant system, electrical system, etc. These codes have been standardized to ensure that the same codes are used by all manufacturers. A first letter of the DTC indicates the family of the DTC, such as "P" for powertrain (i.e., engine and gearbox); "B" for body; "C" for chassis; and "U" for user network. The first digit following the first letter indicates whether the code is generic or not. That is, if the first digit is a "0", then the code is a generic code that is used by all manufacturers. However, if the first digit is a "1", then the code that follows is a manufacturer defined code. That is, while many codes have been standardized, the generic DTC codes do not provide all of the information that the OBD system is capable of providing. Therefore, manufacturers can add as many of their own codes as they need. The next three digits of the DTC can have any hexadecimal value (i.e., values from 0-F). For codes in the powertrain family, a series of subfamilies have been defined. For example, if the first letter of the DTC is "P" and the first digit following the letter is "0", then the second digit following the first letter will indicate the subfamily as follows:

0, 1 and 2 indicate that the DTC relates to the air/fuel mixture;
 3 indicates that the DTC relates to the ignition system;
 4 indicates that the DTC relates to checking auxiliary emissions;
 5 indicates that the DTC relates to engine idling;
 6 indicates that the DTC relates to the onboard computer and ancillary outputs;
 7, 8 and 9 indicate that the DTC relates to the transmission (gearbox); and
 A, B and C indicate that the DTC relates to for hybrid propulsion Currently, approximately 11,000 generic DTCs have been defined. In order to make the codes accessible, Bluetooth enabled diagnostic systems are currently available that allow a user (either vehicle owner or mechanic) to plug a first device into the OBD electrical connector to read out the DTCs from the OBD system. The DTCs can then be communicated over a Bluetooth connection to a second device, such as a smart cellular telephone (smart phone) that can run an application ("App"). The App receives the information from the Bluetooth enabled first device and provides the user with a diagnostic read out that assists the user in determining the status of the vehicle. Such Bluetooth enabled diagnostic systems can be used whether the vehicle is in operation or not. The first device can be plugged in and remain in place over extended periods of time in which the vehicle can alternately be in operation and out of operation.

In some cases, the Bluetooth enabled diagnostic system can simply report of the DTCs that are provided by the OBD system by either directly reporting the DTC or providing some indication of the meaning and significance of the DTCs that have been output from the OBD system.

While vehicles, including gas powered cars, electric powered cars and other motorized vehicles are equipped with several processors that are capable of providing information from sensors throughout the vehicle to an OBD system in the vehicle, the processors typically do not perform sophisticated analysis of the input from the sensors in order to accurately diagnose the status of the vehicle. Rather, the systems currently available in motor vehicles merely receive the status of sensors in the vehicle and provide a DTC associated with the particular status of the sensor.

For example, the evaporative control (EVAP) system in a vehicle is responsible for capturing raw fuel that evaporates from the fuel storage system (i.e., the fuel tank, fuel cap, and filler neck). This system is designed to react to three specific variables: (1) the speed of the vehicle, (2) the engine temperature, and (3) the engine load. After assessing these three variables, the EVAP system stores and purges the fuel vapors it has captured, putting them back into the vehicle's combustion process. In addition, a pressure sensor monitors a constantly changing pressure within the EVAP system and sends readings to a Powertrain Control Module (PCM). If the PCM receives an indication that the pressure is below the manufacturer's specification, the PCM outputs a DTC of P0450 to the OBD connector.

In the example above in which the DTC is generated based solely on the pressure sensor output as relayed to the OBD connector by the PCM, it is possible that the DTC was generated by one of several conditions. First, it is possible that there is a pressure leak in the EVAP system that is causing the pressure sensor to detect a low-pressure condition. Second, it is possible that the pressure is, in fact, within the manufacturer's specification and that the sensor is defective. Still further, it is possible that there is a faulty electrical connection in the circuit from the sensor to the PCM. Another possibility is that the PCM is defective.

In this example, there are several negative impacts that may result from this ambiguity. Since there is substantial potential that any one of several things may be the cause of the DTC, confusion is generated regarding the significance of the DTC that is presented through the OBD electrical connector. This can result in misunderstandings on the part of both the mechanic the owner of the vehicle regarding the cost of repairs that might be warranted to address the condition indicated by the DTC. For example, a mechanic may initially misdiagnose the condition of the vehicle, leading to an estimated cost of repair that is either too high or too low. In addition, the owner of the vehicle may be inclined to take the vehicle out of service for a problem that does not require the vehicle to be removed from service.

Accordingly, it would be generally advantageous to provide a system that can be used with motor vehicles (including electric vehicles) that can more accurately diagnose the condition of the motor vehicle and provide that diagnosis to interested parties.

SUMMARY

Various embodiments of a method and apparatus for diagnosing the status of a vehicle using cognitive SMART sensors are disclosed. SMART sensors are sensors that have at least some processing power directly associated with the sensor. Some embodiments of the disclosed method and apparatus use SMART sensors that include an artificial intelligence (AI) capability that is tightly coupled to the sensor. In some such embodiments, the sensor is an audio sensor, such as a high quality microphone, that can record the sound of the vehicle, such as sounds associated with one or more of the components of the vehicle.

In some embodiments, the output of the sensor is physically coupled directly to the input of the AI engine. In some such embodiments, the sensor and AI engine are packaged together in an integrated circuit (IC). By providing an integrated SMART sensor that has both the sensor and an AI engine integrated together on an IC and packaged together, the SMART sensor can be fabricated relatively inexpensive, and can be made to be very small and power efficient. The combination of these features makes it feasible to place a relatively large number of SMART sensors throughout a vehicle. In some embodiments, the outputs of each of the individual SMART sensors can then be further processed by a higher order AI engine. In some embodiments, such a higher order AI engine resides within the vehicle. In other embodiments such a higher order AI engine is a component of a distributed diagnostic system and lies outside the vehicle. In either case, such a higher order AI engine provides additional analysis of the status of the vehicle in which the SMART sensors reside. Alternatively, or additionally, the output of each SMART sensor provides a direct indication of the status of one or more aspects of the vehicle.

The AI engine within the SMART sensor provides a means by which particular outputs of the sensor can be analyzed to provide a relatively accurate determination of the status at the point of the SMART sensor. Having this processing done near the sensor reduces the amount of power that would otherwise be required to provide the sensor output to a backend processor or other receiving device. Furthermore, the potential for interference in the communication of the sensor output is reduced. That is, even in the case in which the output of a sensor is digitized before being sent to another device for analysis or display, it is possible that noise can corrupt the communication channel from the sensor to the other target device receiving the sensor output, resulting in an inaccurate reading from the sensor. By reducing the output of the sensor to a conclusion regarding the meaning of the sensor data, the output of the SMART sensor is simpler and can be communicated more efficiently and reliably than would otherwise be the case.

In some embodiments, in addition to SMART sensors that include audio sensors, at least some of the other SMART sensors include motion and/or vibration sensors, position/proximity sensors, Global Positioning Systems (GPS) receivers, voltmeters, ammeters, thermometers, light sensors, moisture sensors, accelerometers, tilt sensors (such as gyroscopes, etc.), electric/magnetic field sensors, force/load/torque/stain sensors, flow sensors, chemical/gas sensors, Micro-Electro-Mechanical Systems (MEMS) based sensing mechanisms, etc. In some embodiments, the SMART sensors further include Bluetooth or other short range communication transmitters. In some such embodiments, the transmitter is part of a transceiver.

In some embodiments, the SMART sensor connects over the Bluetooth connection to a Smart Hub within the vehicle. In some such embodiments, the Smart Hub performs additional processing. In some such embodiments, the additional processing is performed by a Hub AI Engine that resides within the Smart Hub. In some such embodiments, the additional processing includes evaluating the combination of different inputs provided by the set of SMART sensors to determine the status of the vehicle. In some such embodiments, the Hub AI Engine can be trained using a training data set that is assembled from a worldwide network of vehicles that provide data from their SMART sensors together with accurate determinations of the associated status of the vehicle from which the SMART sensor data was derived. In addition, the AI engine within each SMART sensor can also be trained using training data assembled from a worldwide network of SMART sensors that are in relevant vehicles.

In some embodiments, the Smart Hub can connect to a cloud server. The cloud server can provide additional processing functionality that can be used to support the functionality of the Smart Hub. In addition, the cloud server can maintain one or more data bases that can be used to hold training data for training the Hub AI Engine and/or the AI Engine within the SMART sensors. In some embodiments, the SMART sensors can be trained under the control of the Hub AI Engine or another training processor within the Smart Hub.

In some embodiments, the Smart Hub can interface with an application ("App") running on a smart phone. In some such embodiments, the App interacts with the Smart Hub by providing instructions through a wireless connection between the phone and a cloud server. Data and instructions can also be communicated from the Smart Hub to the App through the cloud server. The cloud server receives the instructions from the App and either relays them to the Smart Hub or processes the instructions locally within the cloud server. In some such embodiments in which the cloud server processes the instructions received from the App, a processor within the cloud server determines, from the received instructions, the actions to be taken by both the processor within the cloud server and by the Smart Hub and provides any necessary instructions to the Smart Hub. In addition, in some such embodiments, the Smart Hub can access the processor within the cloud server to either provide data or instructions to the App and or the cloud server.

The SMART sensors can be strategically placed throughout the vehicle to acquire information relevant to the status of the vehicle, including placing vibration sensors at points in the vehicle that are likely to detect vibrations indicative of a fault condition in the engine or suspension system, etc. Similarly, audio sensors (i.e., microphones) can be placed in locations throughout the vehicle that allow sounds to be detected that indicate the status of the vehicle.

In some embodiments, once the status of the vehicle is provided to a cloud server, the cloud server can securely share the information with other entities that are authorized to have access to the information. For example, in some embodiments, access to the cloud server may be provided to: (1) an insurance company with whom the owner of the vehicle is ensured; (2) a used vehicle sales organization, such as auction lots and car dealerships; (3) an emergency repair service to which the user subscribes; (4) a vehicle leasing or rental service from which the vehicle has been leased or rented; (5) Original Equipment Manufacturers (OEMs), such as automobile manufactures or automobile component manufacturers; (6) services that provide extended warranties; (7) financial institutions; (8) vehicle tracking services; etc.

In some embodiments, in addition to those functions noted above, or alternatively, data that is collected can be processed to enable "self-healing". That is, using information derived from the SMART sensors, actions can be initiated to autonomously correct maintenance issues. For example, failed systems can be bypassed or redundant systems put into service in place of failed systems. In other embodiments, information provided by the SMART sensors is used to make intentional adjustments to the operational status of the vehicle. For example, if a dangerous condition is detected, the speed of the vehicle might be restricted (such as by regulating the fuel flow, etc.) or in the case in which a dangerous situation is imminent, the vehicle may be disabled in a safe manner.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
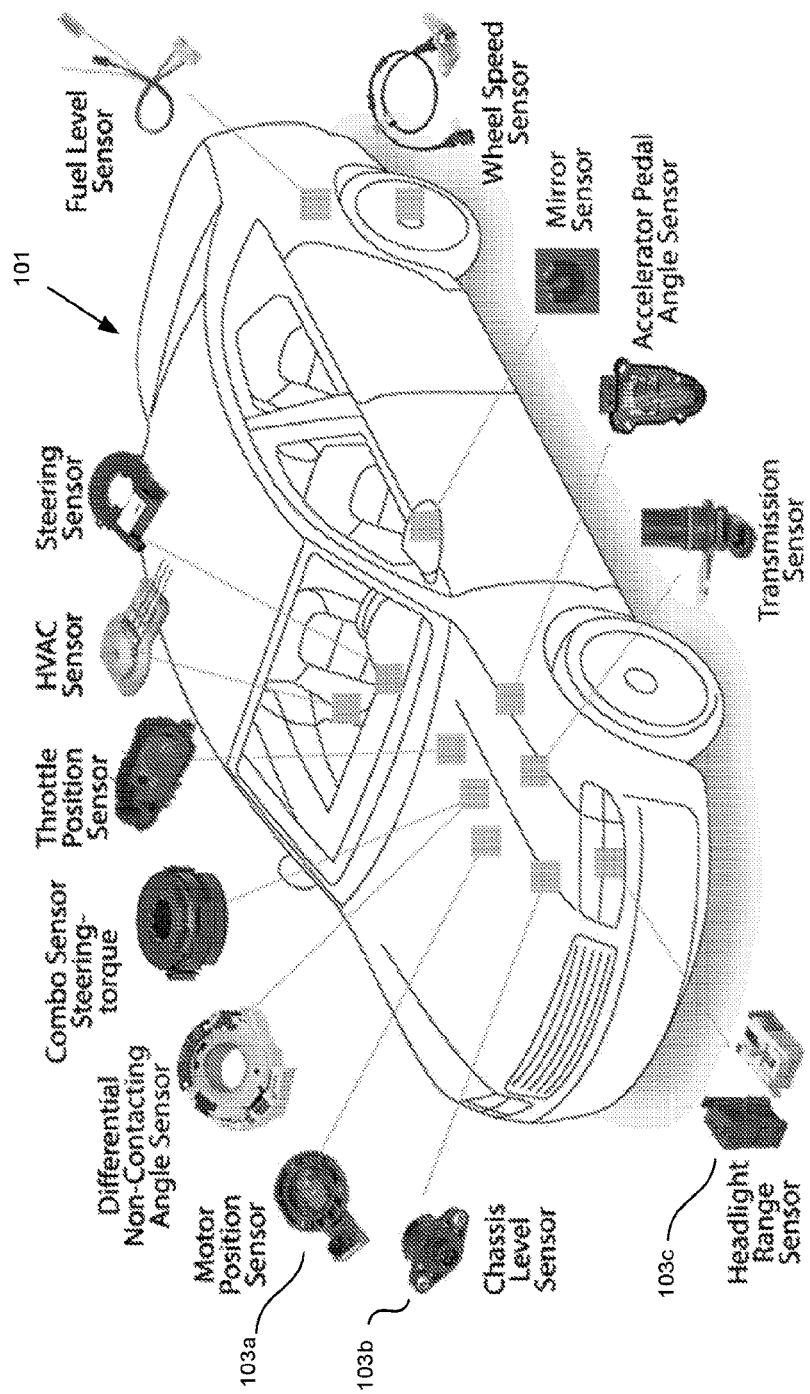
FIG. 1 is an illustration of a vehicle and some of the sensors associated with the OBD system of the vehicle.
Figure 2:
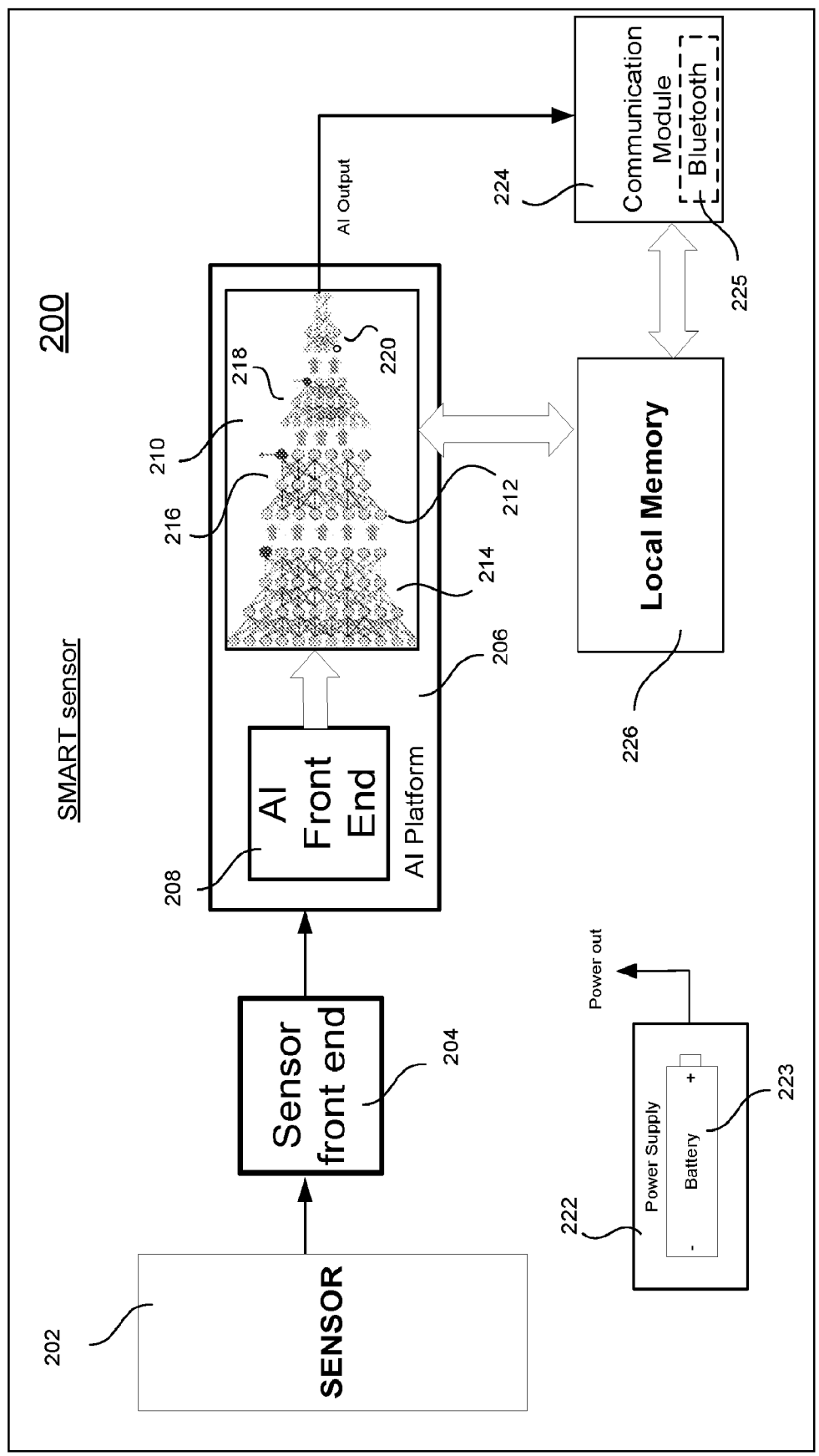
FIG. 2 is a simplified block diagram of a SMART sensor module.

FIG. 2 is a simplified block diagram of a SMART sensor module 200. It should be noted that the particular set of components shown and the particular arrangement of the components (i.e., the way in which they are configured and/or connected) is provided merely as an example of one embodiment of the SMART sensor 200. Other SMART sensors 200 may have additional components not shown or may have fewer components than are shown in FIG. 2. For Example, the battery 223 may be replaced by a connection to a vehicle power source (not shown).

A sensor 202 is the means by which data indicative of the nature of the environment in which the sensor 202 resides is collected by the SMART sensor 200. Any type of sensor capable of providing information about the environment in which the sensor resides may be used. Some examples of sensors 202 that might be used include motion and/or vibration sensors, position/proximity sensors, Global Positioning Systems (GPS) receivers, voltmeters, ammeters, thermometers, light sensors, moisture sensors, accelerometers, tilt sensors (such as a gyroscope, etc.), electric/magnetic field sensors, force/load/torque/stain sensors, flow sensors, chemical/gas sensors, Micro-Electro-Mechanical System (MEMS) based sensing mechanisms, etc.

In some embodiments, the output of the sensor 202 is an electrical signal. However, the output signal may have any format, such as an analog voltage, analog current, digital signal, modulated signal represented in either analog or digital form, light signal, chemical emission or any output format that can be detected and that can provide information indicative of environment in which the sensor 202 resides. Depending upon the type of sensor 202 and the manner in which information is output from the sensor 202, a sensor front end 204 may be provided. The sensor front end 204 provides a buffer between the sensor 202 and the input to an artificial intelligence (AI) platform 206. In addition, the sensor front end 204 may condition the output of the sensor by altering or transforming the format of the output provided by the sensor 202. For example, in some embodiments in which the sensor 202 outputs an analog voltage, the sensor front end 204 amplifies the analog signal and performs an analog to digital conversion (ADC). In other embodiments, the Sensor front end 204 performs a conversion from a current representing the output value to a voltage.

The output from the sensor front end 204 is coupled to the AI platform 206. In some embodiments, the AI platform 206 includes an AI front end 208 and an AI core 210. For the sake of simplicity, the AI core 210 is shown in FIG. 2 as a collection of nodes 212 cross coupled within layers 214, 216, 218, 220. However, those skilled in the art will recognize that the particular architecture of the AI core 210 is not limited to the particular architecture shown. That is, any intelligent system (i.e., machine learning, including artificial neural network, deep feedforward neural networks, deep recurrent neural networks, probabilistic methods for uncertain reasoning, search and optimization methodologies, logic methodologies, such as propositional logic, first-order logic, fuzzy set theory, fuzzy logic, and classifiers and statistical learning methods) can be used to implement the AI core 210.

In some embodiments, a power supply 222 is provided as an integral component of the SMART sensor 200. In some such embodiments, the power supply 222 comprises a battery 223. Alternatively, the power supply 222 can receive power from the power sources within the vehicle and regulate or otherwise condition the power prior to providing power to the components of the SMART sensor 200.

In some embodiments, the SMART sensor 200 has a communication module 224 that allows the SMART sensor 200 to receive training data that is used to initially train the AI core 210 within the AI platform 206, and/or to update the training of the AI core 210. In some embodiments, training data is stored in a local memory 226.

Figure 3:
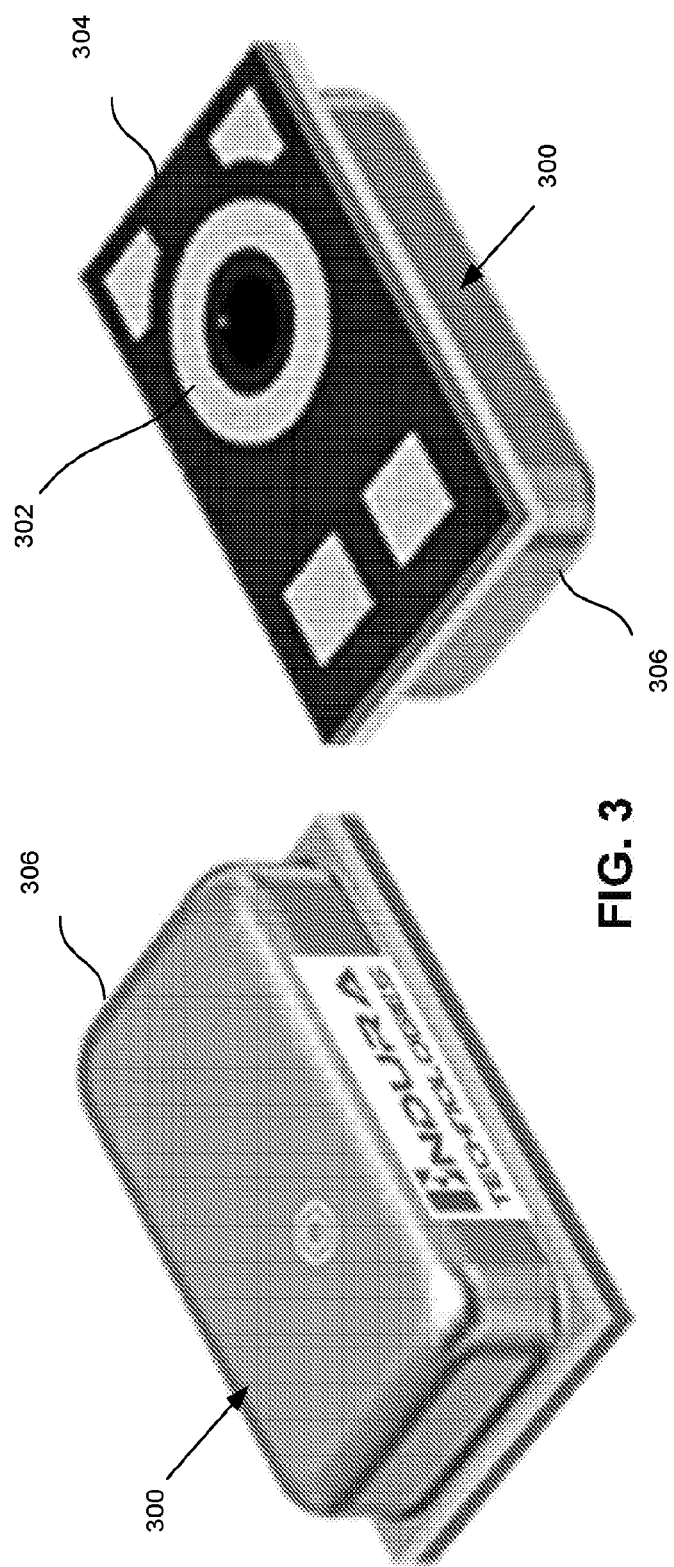
FIG. 3 is an illustration of two SMART sensors similar to the SMART sensor of FIG. 2, however, the sensor is a microphone.

FIG. 3 is an illustration of two encased SMART sensors 300 similar to the SMART sensor 200, however, the sensor is a microphone 302. The components of the SMART sensor 300 are fabricated or mounted on a substrate 304. An enclosure 306 is placed over the substrate 304 to encase the SMART sensor 300. By providing a power supply 222 with a battery 223, there is no need to electrically connect the SMART sensor 300 to the vehicle power supply, simplifying the casing. In addition, the communication module 224 provides a wireless connection for both incoming training data, operational commands to the SMART sensor 300, and outgoing AI output data from the AI core 210. Accordingly, the SMART sensor 300 has only wireless input and output ports.

Figure 4:
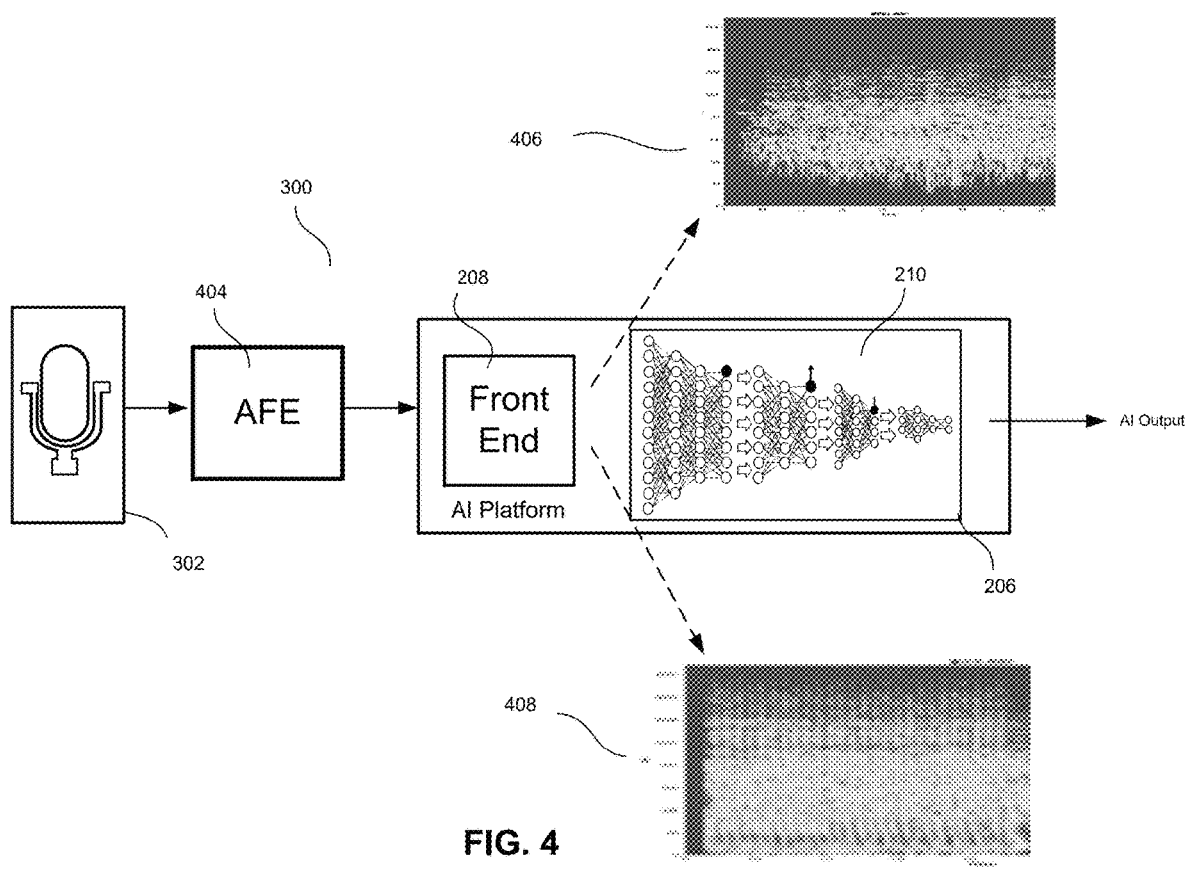
FIG. 4 is a simplified block diagram of the SMART sensor.

FIG. 4 is a simplified block diagram of the SMART sensor 300. While not shown for the sake of simplicity in the figure, some embodiments of the SMART sensor 300 include the power supply 222, communication module 224 and local memory 226 shown in FIG. 2. The sensor front end is an audio front end (AFE) 404 specifically designed to receive the output of the microphone 302, amplify the output and present it to the AI front end 206 in a manner that allows AI core 210 to most effectively process the audio information provided 406, 408. Two sets of audio data 406, 408 are shown. The first set of data 406 illustrates what an audio signal pattern of a healthy transmission looks like. In this example, the SMART sensor 300 is installed on or near the vehicle transmission. The second set of data 408 illustrates what an audio signal pattern of a worn transmission looks like. By training the AI core 210 to distinguish between these two patterns (and those that would result from healthy and worn transmissions), the output of the AI core 210 can indicate if the transmission is worn and in need of service or is healthy.

It should be noted that the transmission of a vehicle will rarely become worn instantaneously. Rather, the audio signals that are detected by the SMART sensor 300 will typically slowly change from one state to the other. Nonetheless, a properly trained AI core 210 can determine when the wear on the transmission requires attention. In addition, in some embodiments, the particular, in some embodiments amount of wear might be determined by the AI core 210. In some such embodiments, a notice may be provided to a user or to a diagnostic station that the transmission has a particular level of wear. In addition, or alternative, an indication may be provided that the transmission is approaching the point at which attention will be required. In some embodiments, by considering historical audio data collected over a period of time, a prediction may be provided regarding how long it will be before attention is required (similar to a gasoline gauge that indicates when a fuel tank might be out of fuel and the number of miles that the driver can expect to drive before requiring additional fuel).

Figure 5:
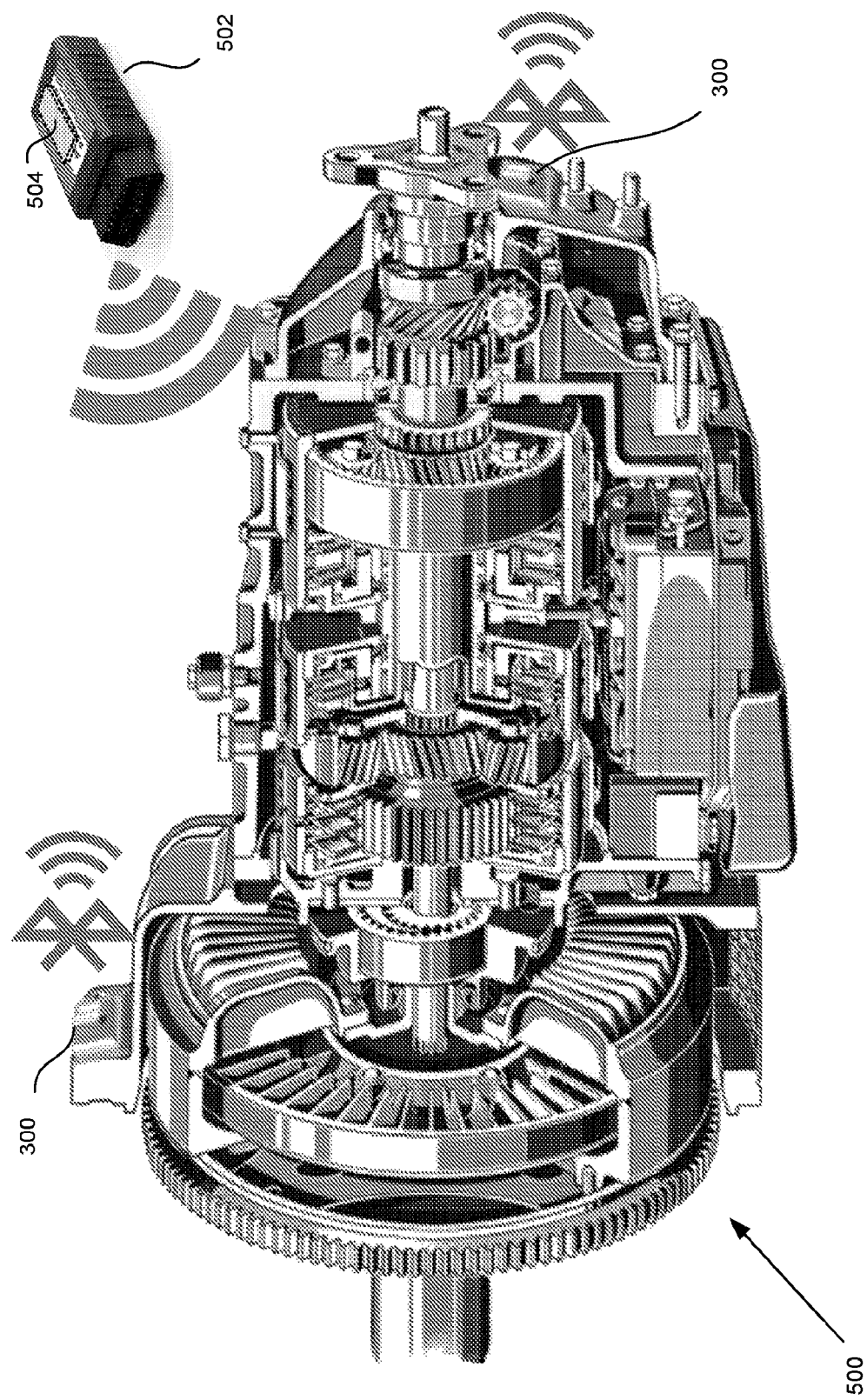
FIG. 5 is an illustration of SMART sensors mounted on a transmission of a vehicle.

FIG. 5 is an illustration of SMART sensors 300 mounted on a transmission 500 of a vehicle. In some embodiments, the communication module 224 includes a Bluetooth transceiver 225. Alternatively, a different wireless communication protocol may be used. In some embodiments, the communication module 224 of the SMART sensor 300 communicates with a Cognitive on-board diagnostic (OBD) Hub 502 mounted within the vehicle.

Figure 6:
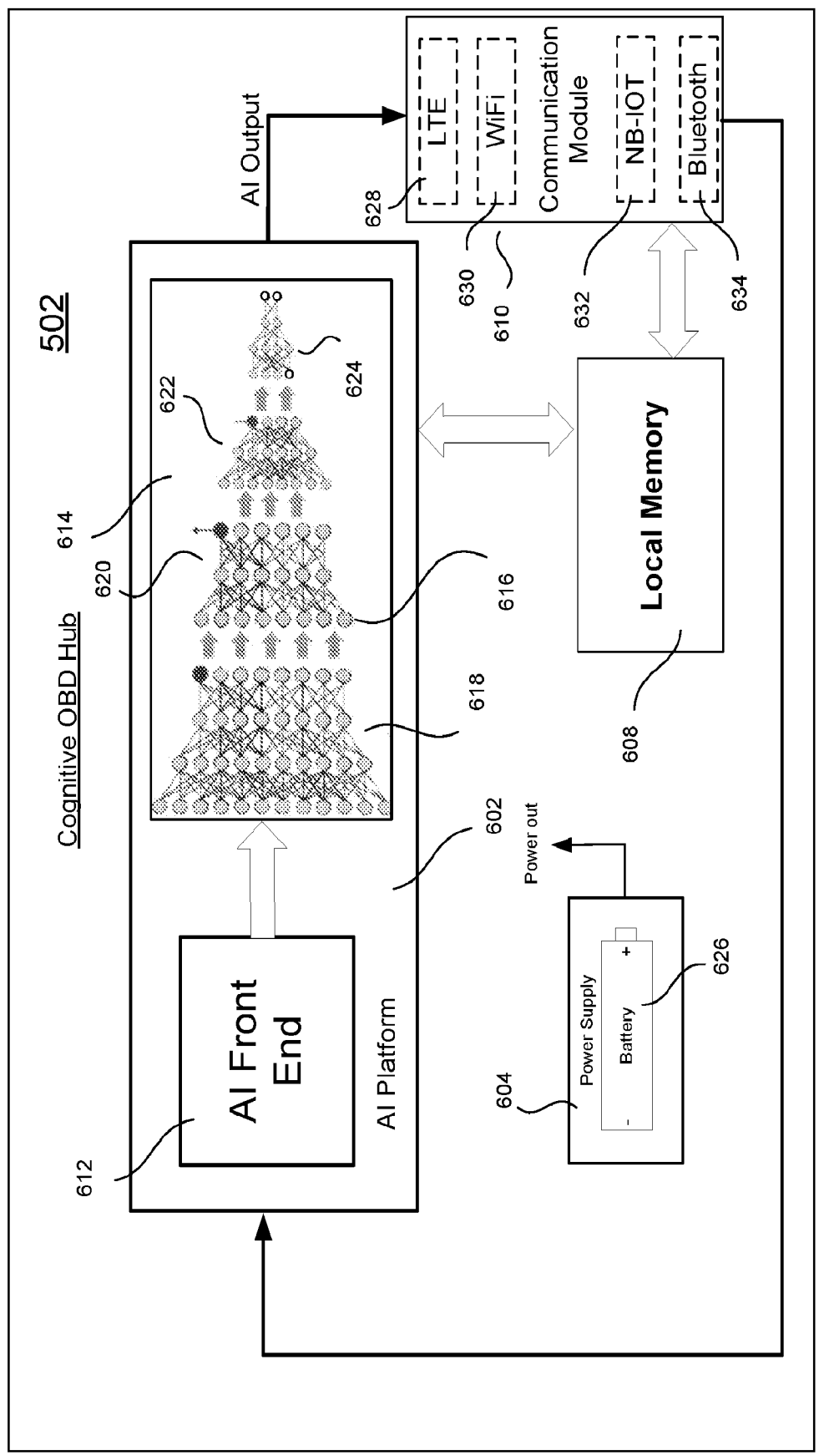
FIG. 6 is an illustration of a block diagram of a cognitive OBH hub.

FIG. 6 is a simplified schematic of a Cognitive OBD Hub 502. The Hub 502 comprises an AI Platform 602, a power supply 604, a local memory 608 and a communication module 610. In one embodiment of the Hub 502, the AI platform 602 comprises an AI front end 612 and an AI core 614. For the sake of simplicity, the AI core 614 is shown in FIG. 6 as a collection of nodes 616 cross coupled within layers 618, 620. 622, 624. However, those skilled in the art will recognize that the particular architecture of the AI core 614 is not limited to the particular architecture shown. That is, any intelligent system (i.e., machine learning, including artificial neural network, deep feedforward neural networks, deep recurrent neural networks, probabilistic methods for uncertain reasoning, search and optimization methodologies, logic methodologies, such as propositional logic, first-order logic, fuzzy set theory, fuzzy logic, and classifiers and statistical learning methods) can be used to implement the AI core 614. In some embodiments, the power supply 604 comprises a battery 626. In other embodiments, the power supply 604 receives power from a power source within a vehicle in which the Hub 502 is installed. In some embodiments, the communication module 610 comprises a plurality of communication sub-modules including an LTE sub-module 628, a WiFi sub-module 630, a NB-IOT sub-module 632, and a Bluetooth sub-module 634.

Accordingly, a communication module 504 within the Cognitive OBD Hub 502 receives the signals transmitted from communication module 224 within the SMART sensor 300. In some embodiments, the communication module 504 is external and hardwired to the Cognitive OBD Hub 502. In other embodiments, the communication module 504 is external and wirelessly coupled to the Cognitive OBD Hub 502.

In some embodiments of the disclosed method and apparatus, SMART sensors 300 that communicate with the Hub 502 have audio sensors (e.g., microphones) 302. The SMART sensors 300 can be installed throughout a vehicle to provide audio information regarding the operational status of various components of the vehicle in which they are installed. For example, audio sensors 302 might be installed on the accelerator pedal, brake pedal, bumper, components of the braking system (such as brake pads or brake shoes), suspension system (such as tie rods, ball joints, etc.), steering system components, wheels, air conditioning/heating system components (such as the fan, air conditioner compressor, etc.), etc.

Figure 7:
FIG. 7 is an illustration of a four cylinder engine on which four SMART sensors are mounted.

FIG. 7 is an illustration of a four cylinder engine 700 on which four SMART sensors 300 are mounted. In some embodiments having a six cylinder engine, six SMART sensors 300 are mounted on the engine block. However, in yet other embodiments, there is no direct relationship between the number of engine cylinders and the number of sensors.

Figure 8:
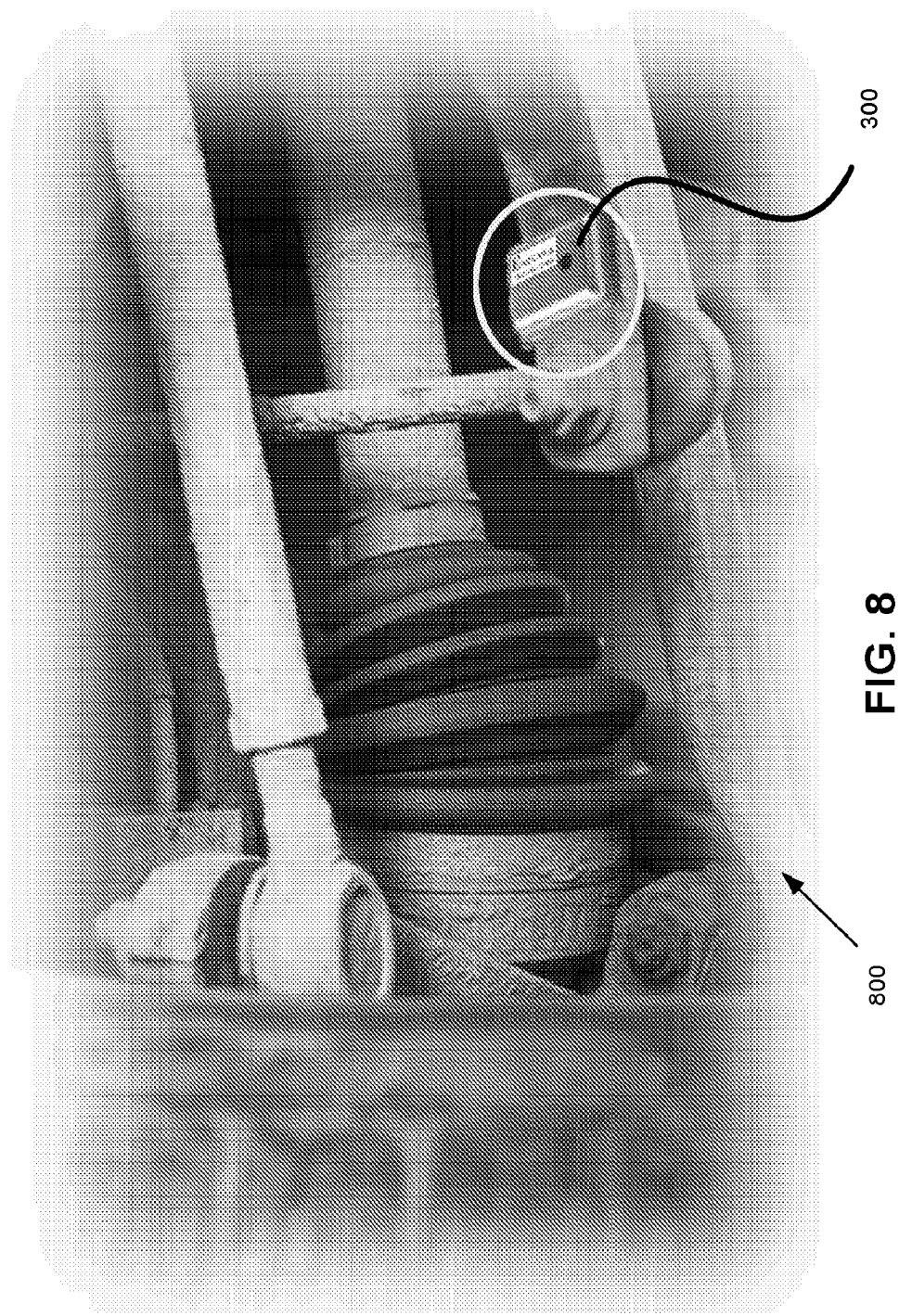
FIG. 8 is an illustration of a portion 800 of a suspension system of a vehicle.

FIG. 8 is an illustration of a portion 800 of a suspension system of a vehicle. A SMART sensor 300 is mounted on the suspension system to determine the status of the joints and other components of the suspension system. In addition, sounds that are captured by this SMART sensor 300 can be used to assist in diagnosing the status and operation readiness of other components of the vehicle. In some embodiments, having sound that has been detected at several locations around the vehicle can improve the quality of the diagnosis of various fault conditions and wear issues.

Figure 9:
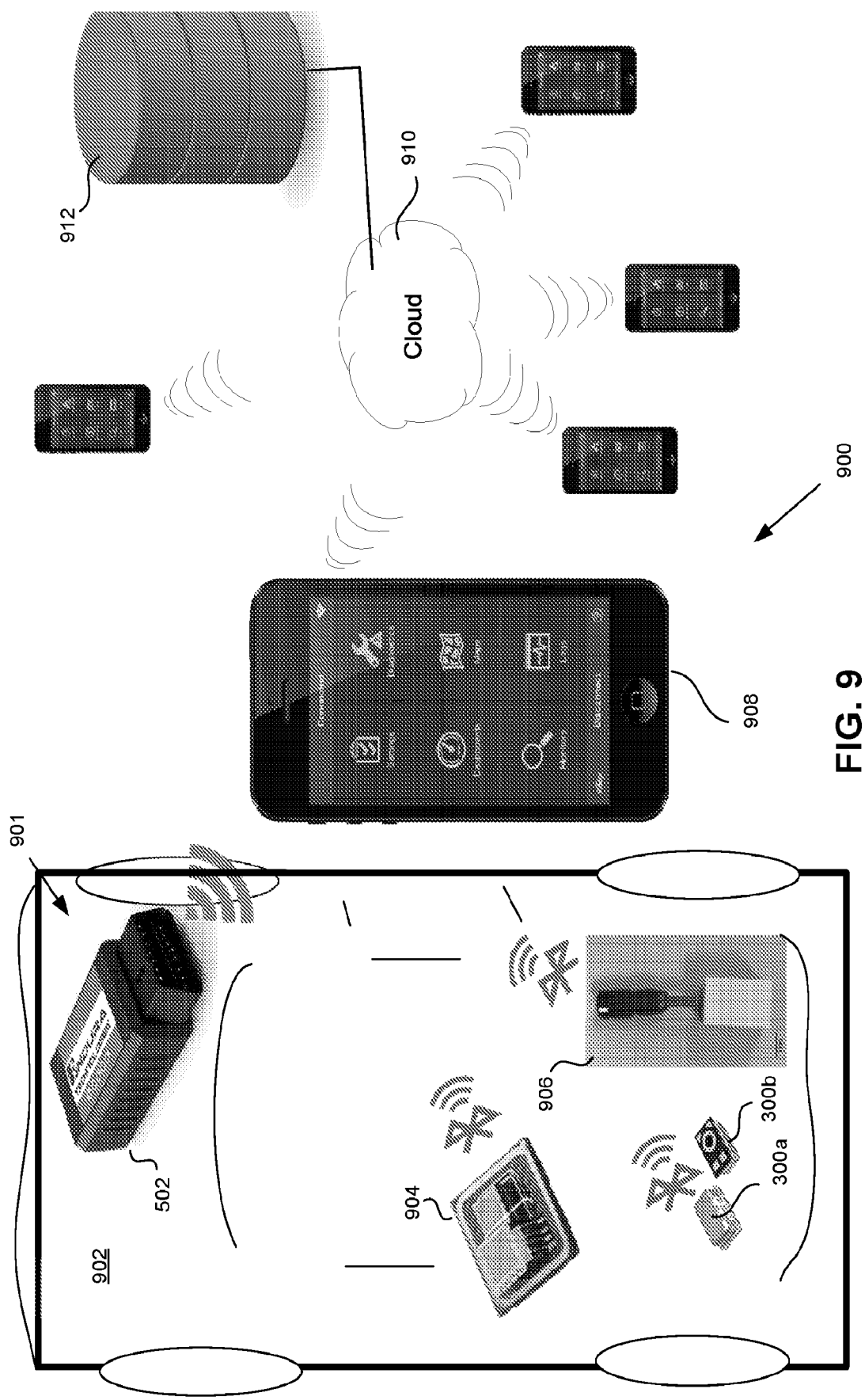
FIG. 9 is an illustration of a complete diagnostic network in which several SMART sensors and a Cognitive OBD Hub are mounted in a vehicle.

FIG. 9 is an illustration of a complete diagnostic network 900. A Cognitive OBD system 901 comprising several SMART sensors 300a, 300b, 904, 906 and a Cognitive OBD Hub 502 is mounted in a vehicle 902. While only one vehicle is shown for the sake of simplicity, it should be understood that a relatively large number of vehicles, each having a Cognitive OBD system 901 installed may be similarly connected to the network 900. The Cognitive OBD Hub 502 communicates with both the sensors 300a, 300b, 904, 906 over a Bluetooth connection and with a smart phone 908 over a wireless cellular connection through a cloud network 910. In some embodiments, the cloud network 910 comprises at least a cloud server, database and processor 912 (shown as a single entity for the sake of simplicity) that provide a gateway between an application ("App") in the smart phone 908a and the Cognitive OBD Hub 502 through a secure connection. In some embodiments, additional smart phones 908b, 908c, 908d, 908e can also run Apps that allow them to access the Cognitive OBD Hub 502 or Cognitive OBDs Hubs in other vehicles. Data collected by sensors in each of the vehicles that are part of the network can be shared anonymously to allow a database of training data to grow and support an increase in the accuracy of the AI cores in each of the sensors and Cognitive OBD Hubs within the network.

In some embodiments, an App that is running on a smart phone 908 can access streaming data output from one or more of the sensors 300, 904, 906. Accordingly, such an App may be used by a potential buyer of the vehicle 908 to hear sounds emanating from the engine and other components of the vehicle and to access analysis of these sounds and other sensor outputs in order to assess the operational status and value of the vehicle 908. Such monitoring can be done in real-time or at a later time based on a recorded audio file.

In other embodiments, an App may be used to gain access to information derived from the sensors 303, 904, 906 for one or more of the following purposes: (1) provide information that can be used to assess the operational status and value of cars remotely in the course of an online auction; (2) to assist car dealers and dealerships to assess the operational status and value of cars remotely; (3) to allow mechanics to remotely assess the operational status and diagnose defects and failures in cars; (4) allow remote asset tracking (in embodiments in which one of the sensors is a GPS receiver); (5) providing remote operational/fault/failure/location status for rental cars; (6) provide failure information and information regarding maintenance history for purposes of determining eligibility of repairs under an original manufacturer's warranty or purchased extended warranty; (7) provide performance information for use by insurance carriers to assess liability in accidents (vehicle collisions, injury and other incidents that result in potential legal liability of the insurance carrier providing insurance coverage related to the vehicle); (8) provide information to financial institutions that have, or are evaluating whether to take a security interest in a vehicle, such information being capable of assisting in remotely assessing the operational status and value of the vehicle; and (9) provide OEMs and vehicle manufacturers with operation status and maintenance logs that can assist with performing failure analysis, including determining factors and conditions that contribute to failures. It should be clear to those skilled in the art that several other Apps will fall within the scope of the disclosed method and apparatus, in which one or more people or institutions would benefit from acquiring data for the purpose of determining the operational and functional status, value and location of a vehicle for one or more purposes, similar to those noted above.

Figure 10:
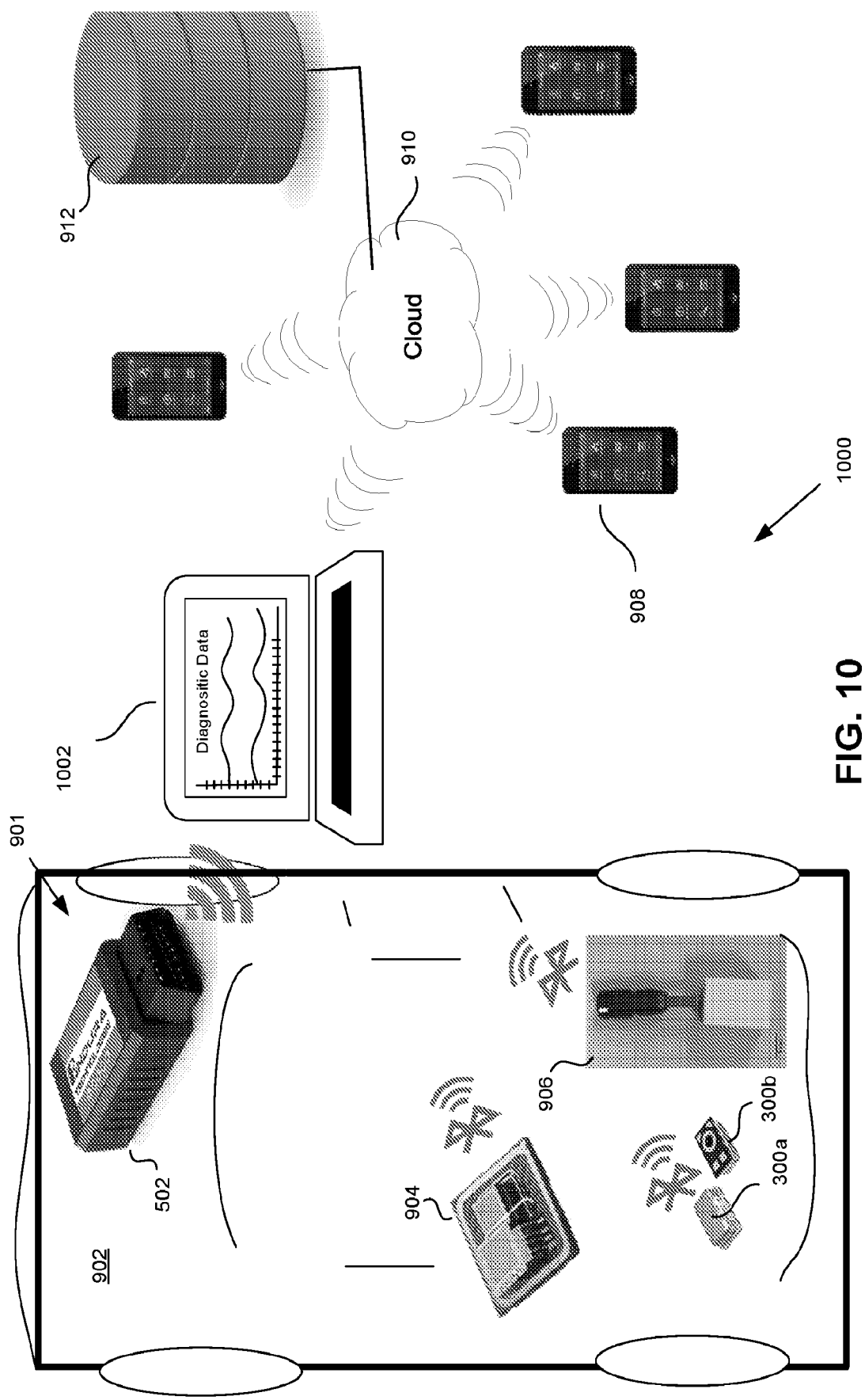
FIG. 10 is an illustration of a complete diagnostic network comprising a laptop shown as displaying performance related information received by a short range communication link, such as a wired link to a OBD connector or a wireless connection, such as Bluetooth between the Cognitive OBD system in the vehicle and the laptop.

FIG. 10 is an illustration of a complete diagnostic network 1000 comprising a laptop 1002 shown as displaying performance related information received by a short range communication link, such as a wired link to a OBD connector or a wireless connection, such as Bluetooth between the Cognitive OBD system in the vehicle and the laptop 1002. In accordance with this embodiment, information provided by a Cognitive OBD system 901 installed in a vehicle can be accessed by the laptop 1002. Also shown is a smart phone 1004 running an App and displaying diagnostic and/or performance related information received by a short range communication link. In some embodiments, the smart phone 1004 is coupled to the Cognitive OBD system within the vehicle via a Bluetooth connection established through a Bluetooth enabled device 1006 that can plug into a OBD connector (not shown) in the Cognitive OBD system. In some embodiments, the use of a laptop 1002 allows the user to more easily input data and commands to the Cognitive OBD system. In addition, in some embodiments, data and analytical output can be more easily displayed on the laptop 1002. The laptop 1002 may be in communication with a cloud network 910 through which the laptop 1002 can access and communicate with other components of the complete diagnostic network 1000, such as a database, cloud server and processor 912, one or more smart phones 908, etc.

Figure 11:
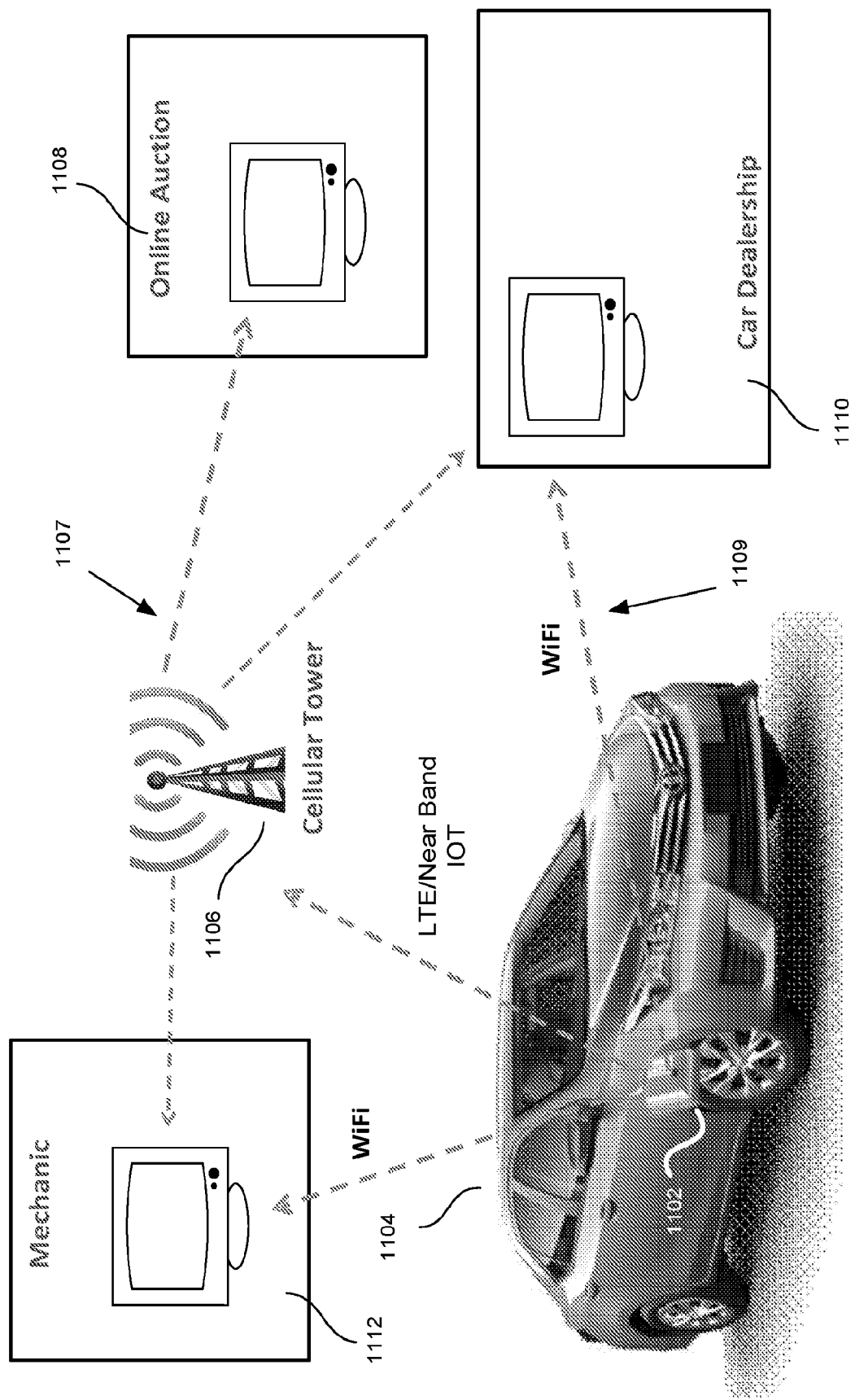
FIG. 11 is an illustration of a stand-alone SMART sensor installed in a vehicle.

FIG. 11 is an illustration of a vehicle 1104 having a stand-alone SMART sensor 1102 installed in the vehicle 1104. The vehicle 1104 is connected to a terminal 1112 that can be accessed by a mechanic. In some embodiments, the SMART sensor 1102 is coupled to the terminal 1112 via a WiFi connection. In addition, the SMART sensor 1102 is coupled to a cellular network through a cellular tower 1106 by LTE, 5G, or any other wireless connection. The SMART sensor 1102 is also shown connected by WiFi to a terminal 1110 at a car dealership.

Figure 12:
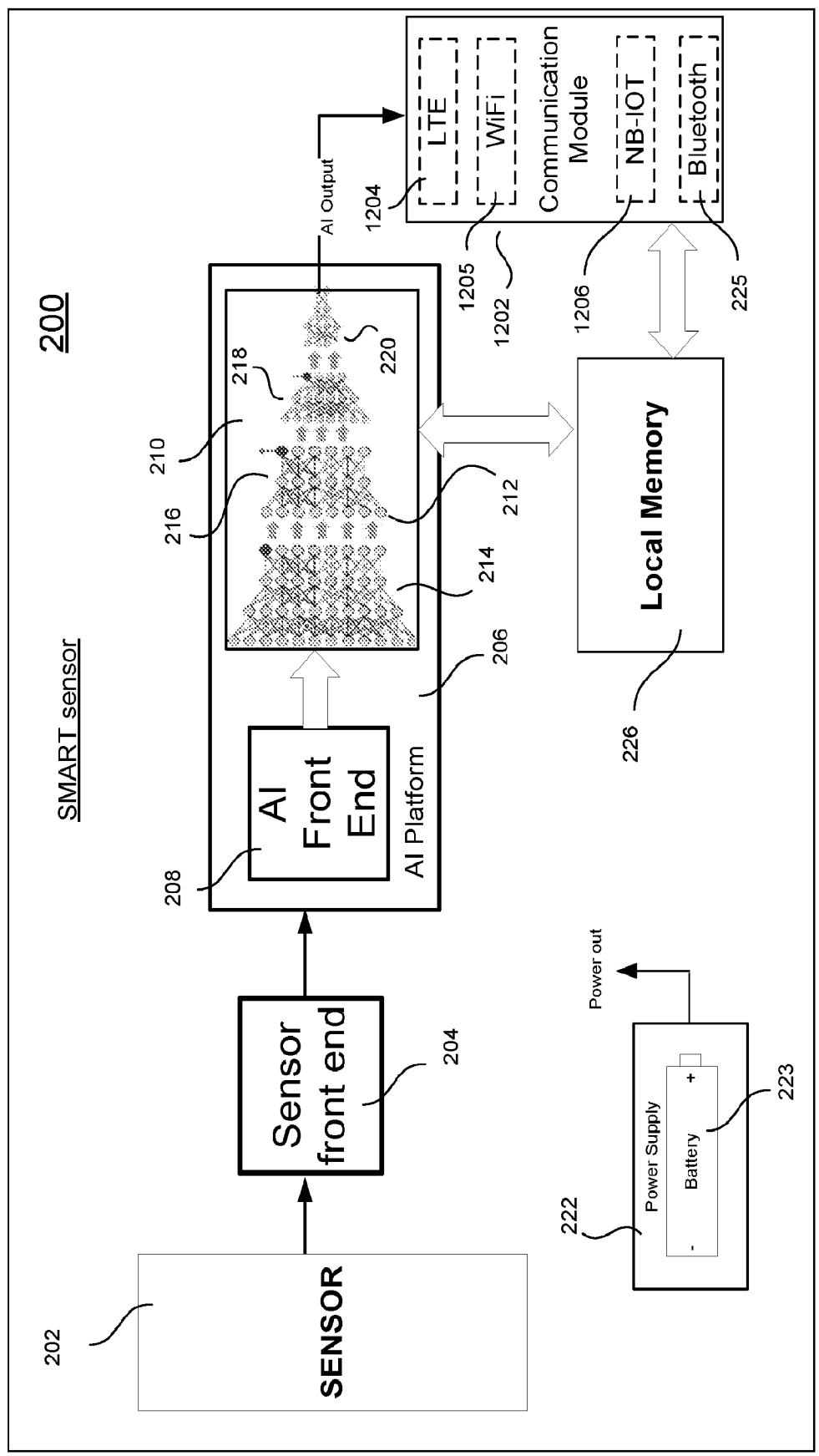
FIG. 12 is a simplified block diagram illustrating one embodiment of the stand-along SMART sensor.

FIG. 12 is a simplified block diagram illustrating one embodiment of the stand-along SMART sensor 1102. The SMART sensor 1102 is similar to the SMART sensor 200 illustrated in FIG. 2. However, the communication module 1202 of the SMART sensor 1102 comprises additional communication sub-modules. One such sub-module 1204 is for communicating over cellular networks in accordance with LTE standards. A second sub-module 1205 is provided to allow communication over a WiFi network. A third sub-module 1206 provides a means for communicating over a near-band Internet-of-Things (NB-IOT) communication link. These, and potentially other sub-modules, are provided in addition to a sub-module for communicating over Bluetooth 225. While one SMART sensor 1102 is shown, several such SMART sensors 1102 can be installed in a vehicle.

Looking again at FIG. 11, in some embodiments the SMART sensor 1102 communicates through the LTE or NB-IOT sub-module 1204, 1206, to a cellular tower 1106 within a cellular network 1107. In at least some embodiments, the cellular tower 1106 also communicates with users, such as individuals or organizations 1108 participating in an online auction and/or with car dealership terminals 1110 and/or one or more terminals 1112 that can be accessed by a mechanic. In such embodiments, information is provided directly from the SMART sensor 1102 to a user through the cellular network 1107. In such embodiments, the "user" is the individual or organization that will be using the information to diagnose, evaluate the operational status, determine the value, determine the location, evaluate the fitness, etc. of the vehicle in which the SMART sensor 1102 is installed. In the case in which the user is a person or entity participating in an online auction and attempting to evaluate the vehicle as part of the auction, the information may be provided through a server or other management software apparatus of an auction house managing the online auction. In some such cases, the auction house may be considered the user, rather than the party that is attempting to decide whether to buy the vehicle. In some such embodiments, in addition or alternatively, the SMART sensor 1102 communicates directly through a WiFi network 1109 with the user.

Since the SMART sensor 1102 comprises a memory and an AI platform capable of doing at least minimal analysis of the sensor output data, the information that is conveyed directly from the SMART sensor 1102 can provide significant insight into the operational status, value, health and fitness, and history. For example, by training the AI core 210 of a SMART audio sensor 300 to detect the sound of a vehicle that is performing without any detectable failure conditions, and also the sound of various failure conditions, the AI core 210 can provide an output that allows those conditions to be detected and communicated to a user either local to the vehicle or at a remote location. In accordance with some embodiments, data received from several such SMART sensors 1102 can be aggregated together in a higher level AI core (not shown) remote from the vehicle 1104. Such a remote higher level AI core may be trained to detect failures and other conditions of interest based on the information provided by the collection of SMART sensors 1102, each of which provide their outputs to the higher level core.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A SMART sensor comprising:
   a) a sensor;
   b) an artificial intelligence (AI) core physically coupled directly to the sensor, the AI core having been trained on a library of sensor inputs that are correlated with specific diagnoses of problems; and
   c) a communication module coupled to the AI core for receiving an output from the AI core providing a diagnosis of a specific problem regarding an environment, the SMART sensor residing in the environment and the AI core communicating the agnosis to at least one external device wirelessly coupled to the communication module.

2. A vehicle in which a SMART sensor is installed, the SMART sensor comprising;
   a) a sensor;
   b) an artificial intelligence (AI) core physically coupled directly to the sensor, the AI core having been trained on a library of sensor inputs that are correlated with specific diagnos problems; and
   c) a communication module coupled to the AI core for receiving an output from the AI core providing a diagnosis of a specific problem regarding an environment the SMART sensor residing in the environment and the AI core communicating the diagnosis to at least one external device wirelessly coupled to the communication module.

3. The vehicle of claim 2 wherein the communication module comprises a Bluetooth communication sub-module.

4. The vehicle claim 2 further comprising:
   a) a power supply having a battery for providing power to—a—sensor, the AI core and the communication module;
   b) a local memory coupled to the communication module and to the AI core, the local memory receiving training data from the communication module, storing the training data and providing the training data to the AI core to assist in the training of the AI core.

5. The vehicle of claim 2, wherein the sensor is an audio sensor.

6. The vehicle of claim 2, further comprising a sensor front end coupled to the sensor and to the AI core for conditioning a signal output from the sensor.

7. The vehicle of claim 2, wherein the SMART sensor is encased in a casing having only wireless input and output.

8. The vehicle of claim 2, wherein the SMART sensor comprises a substrate on which the sensor and the AI core are mounted.

9. The vehicle of claim 2, wherein at least one SMART sensor is mounted—an—engine within the vehicle.

10. The vehicle of claim 2, wherein at least one SMART sensor is mounted on a transmission within the vehicle.

11. The vehicle of claim 2, wherein at least one SMART sensor is mounted on a component of a suspension system within the vehicle.

12. A vehicle in which a Cognitive on-board diagnostic (OBD) system is installed, the Cognitive OBD comprising:
   a) at least one SMART sensor comprising:
      i. a sensor;
      ii. an artificial intelligence (AI) core physically coupled directly to the sensor; and
      iii a communication module coupled to the AI core for receiving an output from the AI core providing a diagnosis of a problem regarding an environment, the SMART sensor residing in the environment and the AI core communicating the diagnosis to at least one external device wirelessly coupled to the communication module
   b) a Cognitive OBD Hub, comprising:
      i. an AI core; and
      ii. a communication module coupled to the AI core, the AI core receiving training data from an external source and coupled to at least one of the SMART sensors, the AI core having trained on the traiing data, the training data including a library of sensor inputs at are correlated with specific agnoses of problems, the communication module further receiving information from the SMART sensor regarding the environment in which the SMART sensor from which the information is received resides, the diagnosis of the problem that is communicated to to the at least one external device being based on the training.

* * * * *